(12) United States Patent
Shimoyama et al.

(10) Patent No.: US 6,630,020 B2
(45) Date of Patent: Oct. 7, 2003

(54) CEMENT ADDITIVE, AND CONCRETE COMPOSITION AND STRUCTURE BOTH CONTAINING THE SAME

(75) Inventors: Yoshihide Shimoyama, Sakura (JP); Takashi Ayata, Sakura (JP); Satoshi Tanaka, Sakura (JP); Fumiaki Hondo, Kyoto (JP)

(73) Assignees: Sanyo Chemical Industries, Ltd., Kyoto (JP); Taiheiyo Cement Corporation, Tokyo (JP)

(*) Notice: Subject to any disclaimer, the term of this patent is extended or adjusted under 35 U.S.C. 154(b) by 0 days.

(21) Appl. No.: 09/913,513

(22) PCT Filed: Dec. 15, 2000

(86) PCT No.: PCT/JP00/08940

§ 371 (c)(1),
(2), (4) Date: Aug. 15, 2001

(87) PCT Pub. No.: WO01/44135

PCT Pub. Date: Jun. 21, 2001

(65) Prior Publication Data

US 2003/0024441 A1 Feb. 6, 2003

(30) Foreign Application Priority Data

Dec. 16, 1999 (JP) .................................... 11-357094

(51) Int. Cl.⁷ .............................................. C04B 24/00
(52) U.S. Cl. ...................... 106/724; 106/725; 106/727; 106/728
(58) Field of Search ................. 106/724, 725, 106/727, 728; 524/2, 5, 8

(56) References Cited

U.S. PATENT DOCUMENTS

| | | | |
|---|---|---|---|
| 3,663,251 A | 5/1972 | Moren et al. ............... 106/90 |
| 4,547,223 A | 10/1985 | Goto et al. | |
| 4,946,904 A | * 8/1990 | Akimoto et al. .............. 524/5 |
| 5,181,961 A | 1/1993 | Umaki et al. ................ 106/724 |
| 5,413,634 A | * 5/1995 | Shawl et al. ................ 106/696 |
| 5,556,460 A | * 9/1996 | Berke et al. ................ 106/823 |
| 5,679,150 A | * 10/1997 | Kerkar et al. ............... 106/808 |
| 5,725,654 A | * 3/1998 | Shawl et al. ................ 106/727 |
| 5,779,788 A | * 7/1998 | Berke et al. ................ 106/809 |
| 5,938,835 A | * 8/1999 | Shawl et al. ................ 106/724 |
| 6,302,955 B1 | * 10/2001 | Kerkar et al. ............... 106/802 |

FOREIGN PATENT DOCUMENTS

| | | |
|---|---|---|
| DE | 2 050 084 | 4/1972 |
| EP | 0 350 904 | 1/1990 |
| JP | 7852/1982 | 1/1982 |
| JP | 62-10947 | 9/1987 |
| JP | 01-131041 | 5/1989 |
| JP | 06-263503 | 9/1994 |
| JP | 07-002557 | 1/1995 |
| JP | 2000-290088 | 10/2000 |

* cited by examiner

*Primary Examiner*—Paul Marcantoni
(74) *Attorney, Agent, or Firm*—Finnegan, Henderson, Farabow, Garrett & Dunner, L.L.P.

(57) ABSTRACT

A cement additive composition for preventing discoloration of the surface of concrete, comprising a cement additive (a) and a water-reducing admixture (b), the additive (a) comprising a mixture of compounds represented by the general formula (1):

$$R_1O(AO)n_1H \qquad (1)$$

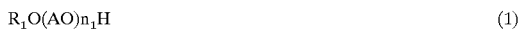

(wherein $R_1$ is a $C_{1-6}$ alkyl group, A is an ethylene group and/or a propylene group, and $n_1$ is a number of 1 or more), containing all the compounds satisfying $n_1 = 2$ to 6 in a total amount of not less than 40% by mass, and having an average $n_1$ of 1.5 to 10, a molecular weight distribution $Mw/Mn$ of not less than 1.05, a Z average molecular weight $Mz$ of not less than 200 and a ratio of (a):(b) by mass of (5 to 99.5):(95 to 0.5). It can prevent the discoloration of the surface of concrete.

29 Claims, No Drawings

CEMENT ADDITIVE, AND CONCRETE COMPOSITION AND STRUCTURE BOTH CONTAINING THE SAME

TECHNICAL FIELD

The present invention relates to a cement additive.

BACKGROUND ART

Generally, the surface of cement, mortar and concrete exposed to the air has the problem of gradual discoloration with time by the action of sunray, dust in the air, microorganisms etc. Accordingly, a method of reducing a water-cement ratio or using a water-permeable concrete form, or applying a water repellant onto the surface of concrete has been known as the method of suppressing discoloration.

One serious drawback of cement, mortar and concrete is that there easily occurs cracking on drying, which is attributable to high shrinkage of cement on drying. Accordingly, various reducing agents for reducing the shrinkage of cement compositions on drying have been proposed, and for example an adduct of alcohol with alkylene oxide (hereinafter abbreviated to AO) and an adduct of alkyl phenol with AO are known (e.g., U.S. Pat. No. 4,547,223 and JP-B 62-10947).

The conventional methods known to suppress discoloration of the surface of concrete are problematic in that special attention should be paid to the compounding method, the type of concrete form, and application of the water repellant.

Further, the conventional admixtures for reducing the shrinkage of cement, when added to concrete compositions, have the problem that the air content is easily influenced by the mixed concrete temperature, and if the air content is attempted to be regulated by an air-entraining admixture, a slight difference in the amount of the air-entraining admixture leads to a change in the air content in concrete, thus causing the problem that concrete containing a predetermined air content is hardly obtained.

DISCLOSURE OF INVENTION

The present inventors extensively studied a cement additive for preventing discoloration of the surface of concrete and a cement additive for easily regulating the air content in concrete, and as a result they arrived at the present invention.

That is, the present invention relates to [I] a cement additive composition for preventing discoloration of the surface of concrete, which comprises a cement additive (a) and a water-reducing admixture (b), wherein (a) comprises a mixture of compounds represented by the general formula (1):

(wherein $R_1$ is a $C_{1-6}$ alkyl group, A is an ethylene group and/or a propylene group, and $n_1$ is a number of 1 or more), and all the compounds wherein $n_1$ is 2 to 6 are present in (a), the total content thereof (i.e. the content of the compounds wherein $n_1$=2 to 6) is 40% by mass or more, the average of $n_1$ is 1.5 to 10, the molecular weight distribution Mw/Mn is 1.05 or more, the Z average molecular weight Mz is 200 or more, and the ratio of (a):(b) by mass is (5 to 99.5):(95 to 0.5).

Further, the present invention relates to [II] a cement additive composition, which comprises a combination of (c) a compound or a mixture of two or more compounds represented by the general formula (2):

(wherein $R_2$ is hydrogen or a $C_{1-6}$ alkyl group, A is an ethylene group and/or a propylene group, and $n_2$ is a number of 1 to 10 on average) and (d) a compound or a mixture of two or more compounds represented by the general formula (3):

(wherein $R_3$ is a $C_{1-4}$ alkyl group, and $n_3$ is a number on average of at least $n_2$ +1 or of more than 10 to 100), the ratio of (c):(d) by mass being 100:(0.01 to 1).

Further, the present invention relates to [III] a concrete composition comprising a cement, any one of the above compositions in an amount of 0.5 to 10% based on the mass of the cement, water and an aggregate.

Further, the present invention relates to [IV] a concrete structure produced by hardening the concrete composition described above.

DETAILED DESCRIPTION OF THE INVENTION

In the general formulae (1) and (2), the alkyl group $R_1$ and $R_2$ include a $C_{1-6}$ straight-chain or branched alkyl group such as methyl, ethyl, n- and i-propyl, n-, i- and t-butyl, n-, i- and t-pentyl, and n- and i-hexyl. The alkyl group is preferably a $C_{1-4}$ alkyl group, more preferably methyl and a straight-chain or branched butyl group.

In the general formula (1) and (2), A is an ethylene group and/or a propylene group, and AO is an oxyethylene group and/or an oxypropylene group, which are formed usually by adding ethylene oxide (hereinafter abbreviated to EO) and/or propylene oxide (hereinafter abbreviated to PO). If EO and PO are added in combination, they may be added in an arbitrary ratio (e.g., a molar ratio of from 1:99 to 99:1) in either a block or random form. When EO and PO are added in combination, block addition is preferable.

The additive (a) comprises a mixture of compounds represented by the general formula (1), in which the total content of the compounds wherein $n_1$ is 2 to 6 is 40% or more, preferably 50% or more. In the general formula (1), $n_1$ is a number of 1 or more, preferably a number of 1 to 10. The average of $n_1$ is 1.5 to 10, preferably 2 to 7. In the foregoing and following description, % refers to % by mass unless otherwise specified.

The molecular weight distribution (Mw/Mn) of (a) [Mw and Mn refer respectively to weight-average and number-average molecular weights determined by gel permeation chromatography (GPC)] is 1.05 or more, preferably from 1.07 to 2. The Mz of (a) (determined by GPC) is 200 or more, preferably 250 to 1000. If (a) is outside of this range, it is not possible to achieve an excellent effect of preventing discoloration of the surface of concrete.

Insofar as the water-reducing admixture (b) used in the present invention is an admixture used generally for concrete, its composition is no limited. The water-reducing admixture (b) includes e.g. materials ordinarily used as air-entraining and water-reducing admixtures, high-range water-reducing admixtures, air-entraining and high-range water-reducing admixtures and superplasticizer [described in e.g. "Developed Techniques of Concrete Admixtures" published by C. M. C. Ltd. (1995)], and examples of such materials include lignin sulfonates (i.e. salts of alkali metals such as sodium and salts of alkaline earth metals such as calcium; this also applies to salts of the following compounds), naphthalin sulfonate formalin condensate salts (degree of condensation: 5 to 20), melamine sulfonate formalin condensate salts (degree of condensation: 5 to 20), polycarbonates [e.g. poly(meth)acrylate having a Mn of 5000 to 60,000, wherein (meth)acrylate means-acrylate and/or methacrylate, and this also applies throughout the description of the specification], aminosulfonate formalin condensate salts (degree of condensation: 2 to 20), and polycarboxylates [e.g. (meth)acrylic acid-(meth)acrylic acid polyoxyalkylene ester copolymer having a Mn of 10,000 to 600,000] containing polyether group (e.g. polyoxyalkylene group having a polymerization degree of 10 to 200, containing 2 and/or 3 carbon atoms in the alkylene group thereof), and these may also be used in combination. Preferable among these water-reducing admixtures are lignin sulfonates, naphthalin sulfonate formalin condensate salts, polycarboxylates and polyether group-containing polycarboxylates, more preferably lignin sulfonates and polyether group-containing polycarboxylates.

In the cement additive composition of the present invention [I], the ratio by mass of additive (a):water-reducing admixture (b) is (5 to 99.5):(95 to 0.5), preferably (20 to 99):(80 to 1). Here, the mass of (b) refers to the net weight of the water-reducing admixture as nonvolatile matter, that is, the mass from which a diluent such as water was removed. If (a) is less than 5%, the effect of preventing discoloration of the surface of concrete is not satisfactory, while if it exceeds 99.5%, the predetermined workability (particularly consistency) as concrete cannot be achieved.

Before preparation of the concrete composition, (a) and (b) may be previously mixed, or during preparation of the concrete composition, (a) and (b) may be separately added and mixed in the concrete composition.

In the general formula (2), $n_2$ is a number of 1 to 10 on average. Preferably, it is a number of 1.5 to 10 on average, more preferably a number of 2 to 7 on average.

(c) is preferably the compound where $R_2$ is an alkyl group, and (c) is particularly preferably the above-described (a). When (c) is the above-described (a), an excellent shrinkage-reducing effect is demonstrated.

In the general formula (3), $R_3$ is a $C_{1-4}$, straight-chain or branched alkyl group. Such group includes those exemplified for $R_1$. The group is preferably a straight-chain or branched butyl group.

$C_3H_6O$ is formed usually by addition of PO.

$n_3$ is a number on average of at least $n_2+1$ or of more than 10 to 100. $n_3$ is preferably a number of 10 to 100 on average, more preferably a number of 10.1 to 95 on average, particularly preferably a number of 12 to 90 on average and most preferably a number of 20 to 80 on average. When $n_3$ is 10 or less and simultaneously less than $n_2+1$, the air content is increased upon addition of the composition to concrete, while if $n_3$ exceeds 100, defoaming properties are increased so that concrete with the predetermined air content cannot be obtained.

In the cement additive composition of the present invention [II], the ratio by mass of (c):(d) is 100:(0.01 to 1), preferably 100:(0.05 to 0.8). When (d) is less than 0.01 or greater than 1, concrete having the predetermined air content is hardly obtainable, and the resulting composition is not sufficiently satisfactory for practical use.

The composition of the present invention [II] comprises two or more components comprising (c) and (d), and therefore two or more peak molecular weights are present in its molecular weight distribution curve. In the method of mixing (c) with (d), they may be previously mixed, or during preparation of the concrete composition, (c) and (d) may be separately added and mixed in the concrete composition.

In the cement additive composition of the present invention [II], a water-reducing admixture is preferably used in combination to further improve the shrinkage-reducing effect. The water-reducing admixture includes those described for the water-reducing admixture (b), and preferable examples thereof are also described therein.

The ratio by mass of the total of (c) and (d):(b) is preferably (5 to 99.5):(95 to 0.5), more preferably (20 to 99):(80 to 1). When the total of (c) and (d) is in the range of 5 to 99.5%, a sufficient shrinkage-preventing effect is demonstrated, and there is no problem with workability (particularly consistency) as concrete.

Cement to which the additive composition of the present invention is added is conventional hydraulic cement. That is, mention is made of various kinds of Portland cement such as normal Portland cement (high-early-strength Portland cement, moderate-heat Portland cement etc.), blended cement (Portland blast-furnace slag cement, Portland fly-ash cement etc.).

The amount of the cement additive composition of the present invention [I] or [II] added to the concrete composition of the present invention [III] is varied depending on the number of carbon atoms in the alkyl group of the compound represented by the general formula (1) or (2), but its amount is usually 0.5 to 10%, preferably 1 to 8% relative to the cement. If the amount of the cement additive composition used is less than 0.5%, the resulting concrete composition is poor in the effect of preventing discoloration of the surface of concrete or in the effect of reducing shrinkage, while if it exceeds 10%, the resulting concrete composition is practically not satisfactory because the strength of concrete is about ⅔ or less relative to the strength of concrete to which the composition was not added. Further, the amount of the water-reducing admixture (b) in the present invention [II] is preferably 5% or less, more preferably 0.05 to 4% relative to the cement. If its amount is 5% or less, the influence thereof on the strength of concrete is low.

The means of adding the additive composition may be the same as for conventional concrete admixtures. For example, a suitable amount of the additive composition may be admixed with water to be admixed, or may be added to once mixed fresh concrete. Alternatively, the additive composition may be allowed to penetrate into the surface layer of a cement product.

The additive composition of the present invention is not limited by the admixture used. That is, the additive composition can be used in combination with conventional air-entraining admixture (AE admixture) used in concrete, such as resinates and surfactants (polyoxyethylene alkyl aryl ethers etc.); known expansive additives based on calcium sulfoaluminate or quicklime; known accelerators such as calcium chloride, triethanolamine etc.; known retarders such as polyhydric alcohols, sugars, oxycarboxylates etc.; known corrosion inhibitors such as nitrites etc.; and other known admixtures for mortar or concrete. These admixtures are described in "Developed Techniques of Concrete Admixtures" supra.

In the composition of the present invention [III], the amount of the admixture used is varied depending on the type of the admixture but may be in the ordinarily used range. For example, the amount of the air-entraining admixture (AE admixture) is usually 0.1% or less, preferably 0.001 to 0.06% relative to the cement.

The cement additive composition of the present invention can be used in combination with a shrinkage-reducing admixture [described in e.g. "Developed Techniques of Concrete Admixtures" supra] such as phenol or alkyl ($C_{1-3}$) phenol AO (EO and/or PO) adduct (number of moles of AO added: 1 to 10) and polypropylene glycol (number average molecular weight: 500 to 1500) as a component other than those in the cement additive composition of the present invention.

The amount of the shrinkage-reducing admixture other than the components in the cement additive composition of the present invention [I] or [II] is preferably 50% or less based on the additive composition of the present invention. In the case of 50% or less, the effect of preventing deterioration of the surface of concrete or the easiness of regulating the air content in concrete is not deteriorated.

The total amount of the cement additive other than the cement additive composition of the present invention and the water-reducing admixture (b) in the present invention is preferably 5% or less, more preferably 0.01 to 4% relative to the cement.

Water used in the concrete composition of the present invention [III] is water prescribed in Document 9 attached to Japanese Industrial Standard (JIS) A 5308, and such water includes tap water, other water (water in rivers, lakes and marshes, well-water, etc.), recovered water etc.

In the composition of the present invention, water is used preferably in such an amount that the water/cement ratio (i.e. % of water relative to cement) becomes 65 to 20%. In the case of 65% or less, sufficient concrete strength can be achieved, and in the case of 20% or more, good workability (particularly consistency) can be achieved by use of the water-reducing admixture.

In the concrete composition of the present invention [III], the aggregate includes fine aggregate and coarse aggregate. The fine aggregate used includes the aggregate prescribed in Document 1 attached to JIS A 5308. Such aggregate includes river sand, land sand, pit sand, sea sand, crushed sand etc.

The fine aggregate is compounded in an amount of 500 to 1200 kg per $m^3$ of concrete. By compounding this amount of fine aggregate, the product is excellent in both concrete strength and workability (particularly consistency).

The coarse aggregate used in the concrete composition of the present invention [III] includes the aggregate prescribed in Document 1 attached to JIS A 5308. Such aggregate includes river gravel, land gravel, pit gravel, crushed stone etc.

The coarse aggregate is compounded preferably in an amount of 500 to 1200 kg per $m^3$ of concrete. By compounding this amount of coarse aggregate, the product is excellent in both concrete strength and workability (particularly consistency).

In the composition of the present invention [III], the proportion of fine aggregate (sand-total aggregate ratio) is preferably 35 to 70% by volume. The proportion of fine aggregate indicates the volume % of fine aggregate relative to the total amount of fine aggregate and coarse aggregate, and the optimum proportion of fine aggregate is varied depending on the type and shape of aggregate used, and usually the proportion of fine aggregate is determined in a test such that the unit amount of water becomes minimized within a range in which predetermined workability (particularly consistency) is achieved.

The concrete structure of the present invention [IV] is obtained by hardening the concrete composition of the present invention [III], and the method of hardening thereof is not particularly limited and may be a conventional method. The hardening or curing method may be air drying curing, humid air curing, underwater curing, accelerated curing by heating (steam curing, autoclave curing) and these can also be used in combination.

In the concrete structure of the present invention [IV] wherein the cement additive composition of the present invention [I] was added to cement in an amount of 2.25%, the reduction in lightness of the surface of the concrete structure after 5 years is usually in the range of 2 to 4, as compared with a usual reduction of 9 or more in concrete to which the composition was not added, thus indicating a superior effect of preventing discoloration of the surface of the concrete structure.

Further, in the case of the concrete structure wherein the cement additive composition of the present invention [II] was added to cement in an amount of 2.25% while the air-entraining admixture (AE admixture) was added to cement in a varying amount from 0.002% to 0.01%, an air content therein is usually in the range of 2 to 7% by volume, as compared with an air content is sometimes either less than 2% or higher than 8% by volume upon addition of the conventional shrinkage-reducing agent, thus indicating less influence of the varying amount of the AE admixture on air entrainment thereby achieving easy regulation of the air content in concrete.

Best Mode for Carrying out the Invention

Hereinafter, the present invention is described in more detail by reference to the Examples, which are not intended to limit the present invention. In the Examples, the term "parts" refers to "parts by mass".

In a test method on the effect of preventing discoloration, a test specimen having a thickness of 15 cm, a height of 100 cm and a width of 50 cm assumed to be used as a wall member was prepared for each compounding condition. 7 days after, the test specimen was removed from a concrete form and subjected to air-curing at room temperature for 28 days. Thereafter, the test specimen was installed outdoors in Tokyo with its poured surface up and its 50 cm×100 cm surface toward north and south. As the concrete form, a urethane-coated plywood was used.

The color of the surface of each test specimen was measured by an L*a*b* color-specifying meter (JIS Z 8729) using a contact-type colorimetric color difference meter (Minolta Co., Ltd.), and the effect of preventing discoloration was evaluated in terms of lightness (L value). As regards the measurement position, color measurement was conducted at 10 sites in total apart by 5 cm, 15 cm, 25 cm, 35 cm and 45 cm from the left-hand side on the horizontal line apart by 15 cm and 30 cm from the upper end of the north surface. The results are expressed in terms of the average of L values at the 10 sites. The measurement was conducted at the start of the exposure test and after 5 years of exposure, respectively.

Further, the slump was measured according to JIS A 1101, the air content in concrete was measured according to JIS A 1128 and the degree of shrinkage was measured according to JIS A 1129. A φ10×20 cm concrete sample was prepared according to JIS A 1132 and subjected to underwater curing at 20° C. for 28 days and measured compressive strength according to JIS A 1108.

The raw materials of concrete used in the Examples and Comparative Examples are as follows.

In the following, Me is methyl alcohol, n-Bu is n-butyl alcohol, i-Bu is i-butyl alcohol, and the value in the parenthesis indicates the average number of moles of units added; for example Me-EO (1)-PO (4) indicates a methyl alcohol-ethylene oxide (average number of moles of EO added: 1)-propylene oxide (average number of moles of PO added: 4) block adduct.

Cement Additive (a) in the Present Invention [I]

TABLE 1

Cement Additives (a) in the present invention [I] and their comparative additives (R)

| Symbol | Type | Compound represented by general formula (1) (%) *1 | Average of $n_1$ | Mw/Mn | Mz |
|---|---|---|---|---|---|
| a-1 | Me-EO(1)-PO(4) | 91 | 5 | 1.09 | 377 |
| a-2 | n-Bu-PO(2)-EO(2) | 71 | 4 | 1.13 | 435 |
| R-1 | n-Bu-EO(2) | 100 | 2 | 1.00 | 170 |
| R-2 | n-Bu-PO(8)-EO(8) | 9 | 16 | 1.18 | 1463 |

*1 Total mass % of compounds of general formula (1) where $n_1$ is 2 to 6.

The Mw, Mn and Mz in Table 1 were measured under the following conditions:
Measuring unit:
  GPC system [HLC-8120GPC] manufactured by Tosoh.
Eluent:
  Type, tetrahydrofuran
  Flow rate, 0.6 (ml/min.)
Columns:
  TSK gel Super H2000
  +TSK gel Super H3000
  +TSK gel Super H4000
Cement Additive Compositions (C) of the Present Invention [II]
C-1: A composition of 100 parts of Me-PO (3) and 0.05 part of n-Bu-PO (30)
C-2: A composition of 100 parts of n-Bu-EO (2) and 0.1 part of n-Bu-PO (30)
C-3: A composition of 100 parts of n-Bu-PO (2)-EO (2) and 0.5 part of i-Bu-PO (50)
C-4: A composition of 100 parts of Me-EO (1)-PO (4) and 0.05 part of n-Bu-PO (30)
Comparative Cement Additives or Cement Additive Compositions (R)
R-3: Me-PO (3)
R-4: n-Bu-PO (2)-EO (2)
R-5: A composition of 100 parts of n-Bu-PO (2)-EO (2) and 3 parts of n-Bu-PO (30)
R-6: A composition of 100 parts of n-Bu-PO (2)-EO (2) and 0.1 part of n-Bu-PO (120)
R-7: Me-EO (1)-PO (4)

Water-Reducing Admixtures (b)
b-1: Air-entraining and water-reducing admixture (Pozzolith No. 70, produced by NMB)
b-2: Air-entraining and high-range water-reducing admixture (Rheobuild SP-8S, produced by NMB)

The above "Pozzolith" and "Rheobuild" are registered trademarks. "Microair" in the AE admixture (H) below is also a registered trademark.
Cement (D)
D-1: Normal Portland cement (produced by Taiheiyo Cement Corp.)
Water (E)
E-1: Tap water
Fine Aggregate (F)
F-1: Crushed sand (specific gravity: 2.60, fineness modulus= 2.80, produced by Chichibu Kogyo Co., Ltd.)
Coarse Aggregate (G)
G-1: Crushed stone (2005, specific gravity of 2.60, produced by Chichibu Kogyo Co., Ltd.)
AE Admixture (H)
H-1: Microair 303A produced by NMB EXAMPLES 1 to 4

Comparative Examples 1 to 5

Concrete structures (wall members) were constructed by hardening concrete compositions with the mix propotion shown in Table 2. The results of the consistency (slump) of the resulting concrete compositions and the color difference of the surface of concrete after outdoor exposure for 5 years are shown in Table 3 In Comparative Example 5, a composition with objective slump could not be obtained and could not be poured, and thus color difference could not be measured.

The products of the present invention indicated a reduction of 2 to 3 in lightness after 5 years, and their discoloration could be sensed at slight degrees. On the other hand, the comparative products indicated a reduction of about 10 to 12 in lightness after 5 years, and the dark discoloration of the surface could be clearly sensed. From the foregoing, it is understood that the surface of the concrete structures obtained by hardening the cement additive composition of the present invention [I] for preventing discoloration of the surface of concrete undergoes less discoloration.

TABLE 2

Mix propotion of Concrete

| | | Cement additive | | Water-reducing admixture | | | Sand- | Quantity of material per unit volume of concrete (kg/ ) | | | |
|---|---|---|---|---|---|---|---|---|---|---|---|
| | | | Addition | | Addition | | total | | | | |
| | | Type | amount (%/cement) | Type | amount (%/cement) | Objective slump (cm) | Water-cement ratio (%) | aggregate ratio (%) | Water [1) ] E-1 | Cement D-1 | Fine aggregate F-1 | Coarse aggregate G-1 |
| Product of the Invention | 1 | a-1 | 2.0 | b-1 | 0.25 | 18 ± 2 | 55 | 45 | 165 | 300 | 826 | 1012 |
| | 2 | a-1 | 2.0 | b-2 | 0.80 | 8 ± 2 | 40 | 42 | 151 | 378 | 758 | 1051 |
| | 3 | a-2 | 2.0 | b-1 | 0.25 | 18 ± 2 | 55 | 45 | 165 | 300 | 826 | 1012 |
| | 4 | a-2 | 2.0 | b-2 | 0.80 | 8 ± 2 | 40 | 42 | 151 | 378 | 758 | 1051 |
| Comparative Example | 1 | — | — | b-1 | 0.25 | 18 ± 2 | 55 | 45 | 165 | 300 | 826 | 1012 |
| | 2 | R-1 | 2.0 | b-1 | 0.25 | 18 ± 2 | 55 | 45 | 165 | 300 | 826 | 1012 |
| | 3 | R-2 | 2.0 | b-1 | 0.25 | 18 ± 2 | 55 | 45 | 165 | 300 | 826 | 1012 |
| | 4 | a-1 | 0.01 | b-1 | 0.25 | 18 ± 2 | 55 | 45 | 165 | 300 | 826 | 1012 |
| | 5 | a-2 | 2.0 | b-1 | 0.005 | 18 ± 2 | 55 | 45 | 165 | 300 | 826 | 1012 |

[1)] Because the cement additive is added as a part of water, the amount of water + cement additive is shown

TABLE 3

Test results of concrete

|  |  | Slump (cm) | Lightness At the start of the exposure test | Lightness After exposure for 5 years |
|---|---|---|---|---|
| Product of the Invention | 1 | 18.5 | 59.4 | 56.1 |
|  | 2 | 8.5 | 57.1 | 54.3 |
|  | 3 | 17.5 | 60.0 | 57.2 |
|  | 4 | 8.0 | 56.6 | 54.0 |
| Comparative Product | 1 | 18.0 | 59.1 | 49.5 |
|  | 2 | 17.5 | 59.6 | 47.8 |
|  | 3 | 17.0 | 58.9 | 46.7 |
|  | 4 | 18.5 | 59.3 | 47.4 |
|  | 5 | 2.5 | — | — |

EXAMPLES 5 to 16

Comparative Examples 6 to 20

When the concretes shown in Tables 4-1 and 4-2 were mixed at temperatures of 10° C., 20° C. and 30° C., the amounts of AE admixture for achieving the desired air content (4.5±1.5% by volume) are shown in Tables 5-1 and 5-2. Further, the measurement results of the degree of shrinkage and compressive strength of these concretes are shown in Tables 5-1 and 5-2.

As can be seen from the results in Tables 5-1 and 5-2, the influence of the mixed concrete temperature on air entrainment is low when the cement additive composition of the present invention [II] is used. Further, the degree of shrinkage and compressive strength are not problematic as compared with the case where the conventional shrinkage-reducing agent is used.

TABLE 4-1

Mix propotion of Concrete

|  |  | Cement additive | | Water reducing admixture | | Slump (cm) | Objective air content (%) | Water-cement ratio (%) | Sand total aggregate ratio (%) | Quantity of material per unit volume of concrete (kg/ ) | | | |
|---|---|---|---|---|---|---|---|---|---|---|---|---|---|
|  |  | Type | Addition amount (%/cement) | Type | Addition amount (%/cement) |  |  |  |  | Water [1] E-1 | Cement D-1 | Fine aggregate F-1 | Coarse aggregate G-1 |
| Product of the Invention | 5 | C-1 | 2.0 | b-1 | 0.25 | 18 ± 2 | 4.5 ± 1.5 | 55 | 45 | 165 | 300 | 826 | 1012 |
|  | 6 | C-1 | 4.0 | b-1 | 0.25 | 18 ± 2 |  | 55 | 45 | 165 | 300 | 826 | 1012 |
|  | 7 | C-1 | 2.0 | b-2 | 0.80 | 8 ± 2 |  | 40 | 42 | 151 | 378 | 758 | 1051 |
|  | 8 | C-2 | 2.0 | b-1 | 0.25 | 18 ± 2 |  | 55 | 45 | 165 | 300 | 826 | 1012 |
|  | 9 | C-2 | 4.0 | b-1 | 0.25 | 18 ± 2 |  | 55 | 45 | 165 | 300 | 826 | 1012 |
|  | 10 | C-2 | 2.0 | b-2 | 0.80 | 8 ± 2 |  | 40 | 42 | 151 | 378 | 758 | 1051 |
|  | 11 | C-3 | 2.0 | b-1 | 0.25 | 18 ± 2 |  | 55 | 45 | 165 | 300 | 826 | 1012 |
|  | 12 | C-3 | 4.0 | b-1 | 0.25 | 18 ± 2 |  | 55 | 45 | 165 | 300 | 826 | 1012 |
|  | 13 | C-3 | 2.0 | b-2 | 0.80 | 8 ± 2 |  | 40 | 42 | 151 | 378 | 758 | 1051 |
|  | 14 | C-4 | 2.0 | b-1 | 0.25 | 18 ± 2 |  | 55 | 45 | 165 | 300 | 826 | 1012 |
|  | 15 | C-4 | 4.0 | b-1 | 0.25 | 18 ± 2 |  | 55 | 45 | 165 | 300 | 826 | 1012 |
|  | 16 | C-4 | 2.0 | b-2 | 0.80 | 18 ± 2 |  | 40 | 42 | 151 | 378 | 758 | 1051 |

[1] Because the cement additive is added as a part of water, the amount of water + cement additive is shown.

TABLE 4-2

Mix propotion of Concrete

|  |  | Cement additive | | Water reducing admixture | | Slump (cm) | Objective air content (%) | Water-cement ratio (%) | Sand total aggregate ratio (%) | Quantity of material per unit volume of concrete (kg/ ) | | | |
|---|---|---|---|---|---|---|---|---|---|---|---|---|---|
|  |  | Type | Addition amount (%/cement) | Type | Addition amount (%/cement) |  |  |  |  | Water [1] E-1 | Cement D-1 | Fine aggregate F-1 | Coarse aggregate G-1 |
| Comparative Example | 6 | R-3 | 2.0 | b-1 | 0.25 | 18 ± 2 | 4.5 ± 1.5 | 55 | 45 | 165 | 300 | 826 | 1012 |
|  | 7 | R-3 | 4.0 | b-1 | 0.25 | 18 ± 2 |  | 55 | 45 | 165 | 300 | 826 | 1012 |
|  | 8 | R-3 | 2.0 | b-2 | 0.80 | 8 ± 2 |  | 40 | 42 | 151 | 378 | 758 | 1051 |
|  | 9 | R-4 | 2.0 | b-1 | 0.25 | 18 ± 2 |  | 55 | 45 | 165 | 300 | 826 | 1012 |
|  | 10 | R-4 | 4.0 | b-1 | 0.25 | 18 ± 2 |  | 55 | 45 | 165 | 300 | 826 | 1012 |
|  | 11 | R-4 | 2.0 | b-2 | 0.80 | 8 ± 2 |  | 40 | 42 | 151 | 378 | 758 | 1051 |
|  | 12 | R-5 | 2.0 | b-1 | 0.25 | 18 ± 2 |  | 55 | 45 | 165 | 300 | 826 | 1012 |
|  | 13 | R-5 | 4.0 | b-1 | 0.25 | 18 ± 2 |  | 55 | 45 | 165 | 300 | 826 | 1012 |
|  | 14 | R-5 | 2.0 | b-2 | 0.80 | 8 ± 2 |  | 40 | 42 | 151 | 378 | 758 | 1051 |
|  | 15 | R-6 | 2.0 | b-1 | 0.25 | 18 ± 2 |  | 55 | 45 | 165 | 300 | 826 | 1012 |
|  | 16 | R-6 | 4.0 | b-1 | 0.25 | 18 ± 2 |  | 55 | 45 | 165 | 300 | 826 | 1012 |
|  | 17 | R-6 | 2.0 | b-2 | 0.80 | 8 ± 2 |  | 40 | 42 | 151 | 378 | 758 | 1051 |
|  | 18 | R-7 | 2.0 | b-1 | 0.25 | 18 ± 2 |  | 55 | 45 | 165 | 300 | 826 | 1012 |
|  | 19 | R-7 | 4.0 | b-1 | 0.25 | 18 ± 2 |  | 55 | 45 | 165 | 300 | 826 | 1012 |
|  | 20 | R-7 | 2.0 | b-2 | 0.80 | 18 ± 2 |  | 40 | 42 | 151 | 378 | 758 | 1051 |

[1] Because the cement additive is added as a part of water, the amount of water + cement additive is shown.

TABLE 5-1

Test Results of Concrete

| | | Mixed Concrete Temperature | | | | | | | | |
|---|---|---|---|---|---|---|---|---|---|---|
| | | 10° C. | | | 20° C. | | | 30° C. | | |
| | | Amount of AE admixture (%/cement) | Degree of shrinkage (91 days) (×10⁻⁴) | Compressive strength (28 days) (N/ ) | Amount of AE admixture (%/cement) | Degree of shrinkage (91 days) (×10⁻⁴) | Compressive strength (28 days) (N/ ) | Amount of AE admixture (%/cement) | Degree of shrinkage (91 days) (×10⁻⁴) | Compressive strength (28 days) (N/ ) |
| Product of the Invention | 5 | 0.003 | 3.52 | 36.5 | 0.005 | 3.71 | 35.8 | 0.006 | 3.81 | 35.0 |
| | 6 | 0.005 | 2.17 | 35.2 | 0.007 | 2.20 | 34.3 | 0.009 | 2.37 | 33.7 |
| | 7 | 0.008 | 3.40 | 48.3 | 0.010 | 3.52 | 46.7 | 0.013 | 3.63 | 46.6 |
| | 8 | 0.004 | 3.67 | 35.7 | 0.005 | 3.67 | 34.9 | 0.007 | 3.78 | 33.3 |
| | 9 | 0.004 | 2.24 | 34.1 | 0.006 | 2.19 | 33.4 | 0.008 | 2.52 | 33.1 |
| | 10 | 0.009 | 3.53 | 49.0 | 0.011 | 3.45 | 47.7 | 0.013 | 3.74 | 48.5 |
| | 11 | 0.005 | 3.46 | 35.8 | 0.006 | 3.49 | 35.1 | 0.008 | 3.55 | 35.2 |
| | 12 | 0.005 | 2.35 | 34.4 | 0.006 | 2.51 | 33.0 | 0.009 | 2.66 | 32.0 |
| | 13 | 0.009 | 3.31 | 47.5 | 0.012 | 3.46 | 47.6 | 0.015 | 3.63 | 45.4 |
| | 14 | 0.003 | 3.49 | 35.1 | 0.005 | 3.53 | 34.8 | 0.006 | 3.55 | 34.0 |
| | 15 | 0.005 | 2.25 | 34.0 | 0.006 | 2.30 | 33.5 | 0.008 | 2.34 | 33.1 |
| | 16 | 0.008 | 3.23 | 48.3 | 0.011 | 3.25 | 46.9 | 0.013 | 3.32 | 46.8 |

TABLE 5-2

Test Results of Concrete

| | | Mixed Concrete Temperature | | | | | | | | |
|---|---|---|---|---|---|---|---|---|---|---|
| | | 10° C. | | | 20° C. | | | 30° C. | | |
| | | Amount of AE admixture (%/cement) | Degree of shrinkage (91 days) (×10⁻⁴) | Compressive strength (28 days) (N/ ) | Amount of AE admixture (%/cement) | Degree of shrinkage (91 days) (×10⁻⁴) | Compressive strength (28 days) (N/ ) | Amount of AE admixture (%/cement) | Degree of shrinkage (91 days) (×10⁻⁴) | Compressive strength (28 days) (N/ ) |
| Comparative Example | 6 | *1 | — | — | 0.002 | 3.71 | 35.5 | 0.029 | 3.81 | 35.0 |
| | 7 | *1 | — | — | 0.001 | 2.25 | 34.0 | 0.033 | 2.39 | 33.8 |
| | 8 | 0.005 | 3.45 | 47.9 | 0.016 | 3.52 | 46.9 | 0.078 | 3.60 | 46.5 |
| | 9 | *1 | — | — | 0.002 | 3.65 | 34.5 | 0.056 | 3.80 | 33.3 |
| | 10 | *1 | — | — | 0.002 | 2.18 | 33.1 | 0.059 | 2.55 | 33.3 |
| | 11 | 0.004 | 3.54 | 48.5 | 0.019 | 3.47 | 47.7 | 0.082 | 3.75 | 48.3 |
| | 12 | *2 | — | — | *2 | — | — | *2 | — | — |
| | 13 | *2 | — | — | *2 | — | — | *2 | — | — |
| | 14 | *2 | — | — | *2 | — | — | *2 | — | — |
| | 15 | *2 | — | — | *2 | — | — | *2 | — | — |
| | 16 | *2 | — | — | *2 | — | — | *2 | — | — |
| | 17 | *2 | — | — | *2 | — | — | *2 | — | — |
| | 18 | *1 | — | — | 0.001 | 3.68 | 35.0 | 0.032 | 3.48 | 34.7 |
| | 19 | *1 | — | — | 0.002 | 2.30 | 33.8 | 0.039 | 2.35 | 33.3 |
| | 20 | 0.005 | 3.50 | 47.4 | 0.018 | 3.51 | 45.1 | 0.087 | 3.56 | 45.6 |

*1 Air content exceeds 6% *2 Air content is less than 3% even if the AE admixture is added in an amount of 0.1%

EXAMPLES 17 to 28

Comparative Examples 21 to 35

The measurement results of the air content entrained in concretes wherein the air-entraining admixture (AE admixture) was added in amounts of 0.002, 0.006 and 0.010% relative to the mass of cement as shown in Tables 6-1 and 6-2 are shown in Table 7. The measurement results of the degree of shrinkage and compressive strength of these concretes are also shown in Table 7.

As can be seen from the results in Table 7, the influence of the amount of the added AE admixture on air entrainment is low when the cement additive composition of the present invention [II] is used

TABLE 6-1

Mix propotion of Concrete

| | | Cement additive | | Water reducing admixture | | AE admixture | Slump air content, temperature | Water-cement ratio (%) | Sand-total aggregate ratio (%) | Quantity of material per unit volume of concrete (kg/ ) | | | |
|---|---|---|---|---|---|---|---|---|---|---|---|---|---|
| | | Type | Addition amount (%/cement) | Type | Addition amount (%/cement) | Addition amount (%/cement) | | | | Water[1] E-1 | Cement D-1 | Fine aggregate F-1 | Coarse aggregate G-1 |
| Product of the Invention | 17 | C-1 | 2.0 | b-1 | 0.25 | 0.002 | Objective values Slump 18 ± 1 (cm) Air content 4.5 ± 1.5 (%) Temperature 20° C. | 55 | 45 | 165 | 300 | 826 | 1012 |
| | 18 | C-1 | 2.0 | b-1 | 0.25 | 0.006 | | 55 | 45 | 165 | 300 | 826 | 1012 |
| | 19 | C-1 | 2.0 | b-1 | 0.25 | 0.010 | | 55 | 45 | 165 | 300 | 826 | 1012 |
| | 20 | C-2 | 2.0 | b-1 | 0.25 | 0.002 | | 55 | 45 | 165 | 300 | 826 | 1012 |
| | 21 | C-2 | 2.0 | b-1 | 0.25 | 0.006 | | 55 | 45 | 165 | 300 | 826 | 1012 |
| | 22 | C-2 | 2.0 | b-1 | 0.25 | 0.010 | | 55 | 45 | 165 | 300 | 826 | 1012 |
| | 23 | C-3 | 2.0 | b-1 | 0.25 | 0.002 | | 55 | 45 | 165 | 300 | 826 | 1012 |
| | 24 | C-3 | 2.0 | b-1 | 0.25 | 0.006 | | 55 | 45 | 165 | 300 | 826 | 1012 |
| | 25 | C-3 | 2.0 | b-1 | 0.25 | 0.010 | | 55 | 45 | 165 | 300 | 826 | 1012 |
| | 26 | C-4 | 2.0 | b-1 | 0.25 | 0.002 | | 55 | 45 | 165 | 300 | 826 | 1012 |
| | 27 | C-4 | 2.0 | b-1 | 0.25 | 0.006 | | 55 | 45 | 165 | 300 | 826 | 1012 |
| | 28 | C-4 | 2.0 | b-1 | 0.25 | 0.010 | | 55 | 45 | 165 | 300 | 826 | 1012 |

[1] Because the cement additive is added as a part of water, the amount of water + cement additive is shown.

TABLE 6-2

Mix propotion of concrete

| | | Cement additive | | Water reducing admixture | | AE admixture | Slump, air content, temperature (%) | Water-cement ratio (%) | Sand-total aggregate ratio (%) | Quantity of material per unit volume of concrete (kg/ ) | | | |
|---|---|---|---|---|---|---|---|---|---|---|---|---|---|
| | | Type | Addition amount (%/cement) | Type | Addition amount (%/cement) | Addition amount (%/cement) | | | | Water[1] E-1 | Cement D-1 | Fine aggregate F-1 | Coarse aggregate G-1 |
| Comparative Example | 21 | R-3 | 2.0 | b-1 | 0.25 | 0.002 | Objective values Slump, 18 ± 1 (cm) Air content, 4.5 ± 1.5 (%) Temperature, 20° C. | 55 | 45 | 165 | 300 | 826 | 1012 |
| | 22 | R-3 | 2.0 | b-1 | 0.25 | 0.006 | | 55 | 45 | 165 | 300 | 826 | 1012 |
| | 23 | R-3 | 2.0 | b-1 | 0.25 | 0.010 | | 55 | 45 | 165 | 300 | 826 | 1012 |
| | 24 | R-4 | 2.0 | b-1 | 0.25 | 0.002 | | 55 | 45 | 165 | 300 | 826 | 1012 |
| | 25 | R-4 | 2.0 | b-1 | 0.25 | 0.006 | | 55 | 45 | 165 | 300 | 826 | 1012 |
| | 26 | R-4 | 2.0 | b-1 | 0.25 | 0.010 | | 55 | 45 | 165 | 300 | 826 | 1012 |
| | 27 | R-5 | 2.0 | b-1 | 0.25 | 0.002 | | 55 | 45 | 165 | 300 | 826 | 1012 |
| | 28 | R-5 | 2.0 | b-1 | 0.25 | 0.006 | | 55 | 45 | 165 | 300 | 826 | 1012 |
| | 29 | R-5 | 2.0 | b-1 | 0.25 | 0.010 | | 55 | 45 | 165 | 300 | 826 | 1012 |
| | 30 | R-6 | 2.0 | b-1 | 0.25 | 0.002 | | 55 | 45 | 165 | 300 | 826 | 1012 |
| | 31 | R-6 | 2.0 | b-1 | 0.25 | 0.006 | | 55 | 45 | 165 | 300 | 826 | 1012 |
| | 32 | R-6 | 2.0 | b-1 | 0.25 | 0.010 | | 55 | 45 | 165 | 300 | 826 | 1012 |
| | 33 | R-7 | 2.0 | b-1 | 0.25 | 0.002 | | 55 | 45 | 165 | 300 | 826 | 1012 |
| | 34 | R-7 | 2.0 | b-1 | 0.25 | 0.006 | | 55 | 45 | 165 | 300 | 826 | 1012 |
| | 35 | R-7 | 2.0 | b-1 | 0.25 | 0.010 | | 55 | 45 | 165 | 300 | 826 | 1012 |

[1] Because the cement additive is added as a part of water, the amount of water + cement additive is shown.

TABLE 7

Test Results of Concrete

| | | Air content (%) | Degree of shrinkage (91 days) ($\times 10^{-4}$) | Compressive strength (28 days) (N/ ) |
|---|---|---|---|---|
| Product of the Invention | 17 | 3.7 | — | — |
| | 18 | 5.2 | 3.44 | 34.9 |
| | 19 | 6.8 | — | — |
| | 20 | 3.5 | — | — |
| | 21 | 5.0 | 3.59 | 34.3 |
| | 22 | 6.4 | — | — |
| | 23 | 3.2 | — | — |
| | 24 | 4.8 | 3.41 | 36.7 |
| | 25 | 6.3 | — | — |
| | 26 | 3.5 | — | — |
| | 27 | 5.2 | 3.59 | 34.0 |
| | 28 | 6.6 | — | — |

TABLE 7-continued

Test Results of Concrete

| | | Air content (%) | Degree of shrinkage (91 days) ($\times 10^{-4}$) | Compressive strength (28 days) (N/ ) |
|---|---|---|---|---|
| Comparative Example | 21 | 4.5 | — | — |
| | 22 | *3 | — | — |
| | 23 | *3 | — | — |
| | 24 | 4.7 | — | — |
| | 25 | *3 | — | — |
| | 26 | *3 | — | — |
| | 27 | *4 | — | — |
| | 28 | *4 | — | — |
| | 29 | *4 | — | — |
| | 30 | *4 | — | — |
| | 31 | *2 | — | — |
| | 32 | *4 | — | — |

TABLE 7-continued

Test Results of Concrete

| | Air content (%) | Degree of shrinkage (91 days) (×10⁻⁴) | Compressive strength (28 days) (N/ ) |
|---|---|---|---|
| 33 | 5.3 | — | — |
| 34 | *3 | — | — |
| 35 | *3 | — | — |

*3 The air content exceeds 8%.
*4 The air content is less than 2%.

Industrial Applicability

When the cement additive composition of the present invention [I] is added to concrete, the discoloration of the surface of concrete can be prevented more easily than by the conventional method. Further, when the cement additive composition of the present invention [II] is added to concrete, both the influence of the mixed concrete temperature and the influence of the amount of the air-entraining admixture (AE admixture) on air entrainment are lower than when the conventional shrinkage-reducing agent is added, and thus the air content in concrete can be easily regulated.

What is claimed is:

1. A cement additive composition for preventing discoloration of the surface of concrete, comprising a cement additive (a) and a water-reducing admixture (b), the additive (a) comprising a mixture of compounds represented by the general formula (1):

$$R_1O(AO)n_1H \quad (1)$$

wherein $R_1$ is a $C_{1-6}$ alkyl group, A is an ethylene group and/or a propylene group, and $n_1$ is a number of 1 or more, containing all the compounds satisfying $n_1=2$ to 6 in a total amount of not less than 40% by mass, and having an average $n_1$ of 1.5 to 10, a molecular weight distribution Mw/Mn of not less than 1.05, a Z average molecular weight Mz of not less than 200 and a ratio of (a):(b) by mass of 5 to 99.5:95 to 0.5.

2. A cement additive composition, comprising (c) a compound or a mixture of two or more compounds represented by the general formula (2):

$$R_2O(AO)n_2H \quad (2)$$

wherein $R_2$ is hydrogen or a $C_{1-6}$ alkyl group, A is an ethylene group and/or a propylene group, and $n_2$ is a number of 1 to 10 on average and (d) a compound or a mixture of two or more compounds represented by the general formula (3):

$$R_3O(C_3H_6O)n_3H \quad (3)$$

wherein $R_3$ is a $C_{1-4}$ alkyl group, and $n_3$ is a number on average more than 10 to 100, the composition having a ratio of (c):(d) by mass of 100:0.01 to 1.

3. A cement additive composition according to claim 2, wherein (c) comprises a mixture of compounds represented by the general formula (1):

$$R_1O(AO)n_1H \quad (1)$$

wherein $R_1$ is a $C_{1-6}$ alkyl group, A is an ethylene group and/or a propylene group, and $n_1$ is a number of 1 or more, contains all the compounds satisfying $n_1=2$ to 6 in a total amount of not less than 40% by mass, and having an average $n_1$ of 1.5 to 10, a molecular weight distribution Mw/Mn of not less than 1.05 and a Z average molecular weight Mz of not less than 200.

4. A cement additive composition according to claim 2, wherein $R_2$ is a $C_{1-4}$ alkyl group, and $R_3$ is a butyl group.

5. A cement additive composition according to claim 2, further comprising at least one water-reducing admixture (b) selected from the group consisting of lignin sulfonates, naphthalin sulfonate formalin condensate salts having a degree of condensation of 5 to 20, melamine sulfonate formalin condensate salts having a degree of condensation of 5 to 20, polycarboxylates aminosulfonate formalin condensate salts having a degree of condensation of 2 to 20 and polycarboxylates containing polyether group.

6. A concrete composition comprising a cement, a composition according to claim 1 contained in an amount of 0.5 to 10% based on the mass of the cement, water and an aggregate.

7. A concrete structure, obtained by hardening a concrete composition according to claim 6.

8. A concrete composition comprising a cement, a cement additive composition according to claim 2 contained in an amount of 0.5 to 10% based on the mass of the cement, water and an aggregate.

9. A concrete structure, obtained by hardening a concrete composition according to claim 8.

10. A cement additive composition according to claim 1, wherein $R_1$ is a methyl group, or a butyl group.

11. A cement additive composition according to claim 1, wherein $(AO)n_1$ in the general formula (1) is formed by adding ethylene oxide and propylene oxide in a block form.

12. A cement additive composition according to claim 1, wherein (b) is at least one compound selected from the group consisting of lignin sulfonates, naphthalin sulfonate formalin condensate salts having a degree of condensation of 5 to 20, melamine sulfonate formalin condensate salts having a degree of condensation of 5 to 20, polycarboxylates, aminosulfonate formalin condensate salts having a degree of condensation of 2 to 20 and polycarboxylates containing polyether group.

13. A cement additive composition according to claim 1, wherein, when the cement additive composition is added to cement in an amount of 2.25% by mass to obtain a concrete structure, the cement additive composition allows the surface of the concrete structure to have a reduction in lightness after 5 years in the range of 2 to 4.

14. A cement composition comprising a cement and a cement additive composition according to claim 1 contained in an amount of 0.5 to 10% based on the mass of cement.

15. A method of producing a concrete structure, which comprises hardening a concrete composition comprising a cement, water and aggregate, wherein the composition containing a cement additive composition according to claim 1 in an amount of 0.5 to 10% based on the mass of the cement whereby discoloration of the surface of the structure is prevented.

16. A cement additive composition according to claim 2, wherein $R_2$ is a methyl group, or a butyl group.

17. A cement additive composition according to claim 2, wherein $(AO)n_2$ in the general formula (2) is formed by adding ethylene oxide and propylene oxide in a block form.

18. A cement additive composition according to claim 2, wherein, when the cement additive composition and air-entraining admixture are added to cement in an amount of 2.25% by mass and in a varying amount from 000.2 to 0.01% respectively to obtain a concrete compositon, the concrete composition has as air content of 2 to 7% by volume.

19. A cement composition comprising a cement and a cement additive composition according to claim 2 contained in an amount of 0.5 to 10% based on the mass of the cement.

20. A concrete composition comprising a cement, water, and aggregate and an air-entraining admixture of not more than 0.1% by the mass relative to the cement, wherein a cement additive composition according to claim 2 in an amount of 0.5 to 10% based on the mass of the cement is added to the concrete composition, thereby allowing the influence of the varying amount of the air-entraining admixture on air entrainment to be reduced.

21. In a concrete composition comprising a cement, a cement additive, water and an aggregate, the improvement comprising using as the cement additive the composition according to claim 1 in an amount of 0.5 to 10% based on the mass of the cement.

22. In a concrete composition comprising a cement, a cement additive, water and an aggregate, the improvement comprising using as the cement additive the composition according to claim 2 in an amount of 0.5 to 10% based on the mass of the cement.

23. In a cement composition comprising a cement and a cement additive, the improvement comprising using as the cement additive the composition according to claim 1 in an amount of 0.5 to 10% based on the mass of the cement.

24. In a cement composition comprising a cement and a cement additive, the improvement comprising using as the cement additive the composition according to claim 2 in an amount of 0.5 to 10% based on the mass of the cement.

25. A concrete structure, obtained by hardening a concrete composition comprising a cement, a cement additive, water and an aggregate, the improvement comprising using as the cement additive the composition according to claim 1 in an amount of 0.5 to 10% based on the mass of the cement.

26. In a concrete structure, obtained by hardening a concrete composition comprising a cement, a cement additive, water and an aggregate, the improvement comprising using as the cement additive the composition according to claim 2 in an amount of 0.5 to 10% based on the mass of the cement.

27. In a method of producing a concrete structure, which comprises hardening a concrete composition comprising a cement, a cement additive, water and an aggregate, the improvement comprising using as the cement additive the composition according to claim 1 in an amount of 0.5 to 10% based on the mass of the cement whereby discoloration of the surface of the structure is prevented.

28. In a concrete composition comprising a cement, water, an aggregate, an air-entraining admixture of not more than 0.1% by mass relative to the cement and another cement additive, the improvement comprising using as the other cement additive the composition according to claim 2 in an amount of 0.5 to 10% based on the mass of the cement, thereby allowing the influence of the varying amount of the air-entraining admixture on air entrainment to be reduced.

29. A cement additive composition according to claim 2, wherein $N_3$ in the general formula (3) is a number of 12 to 90 on average.

* * * * *

UNITED STATES PATENT AND TRADEMARK OFFICE
CERTIFICATE OF CORRECTION

PATENT NO. : 6,630,020 B2
DATED : October 7, 2003
INVENTOR(S) : Yoshihide Shimoyama et al.

It is certified that error appears in the above-identified patent and that said Letters Patent is hereby corrected as shown below:

Column 15,
Line 55, after "average", insert -- of --.

Column 16,
Line 38, after "containing", insert -- a --.
Line 48, after "the mass of", insert -- the --.
Line 51, after "water and", insert -- an --.
Line 62, after "composition and", insert -- an --.
Line 64, "000.2" should read -- 0.002 --.
Line 65, "compositon," should read -- composition, --.
Line 66, "as air content" should read -- an air content --.

Column 17,
Line 5, "and aggregate" should read -- an aggregate --.
Line 6, "by the mass relative" should read -- by mass relative --.
Line 30, "A concrete structure," should read -- In a concrete structure, --.

Column 18,
Line 28, "wherein $N_3$" should read -- wherein $n_3$ --.

Signed and Sealed this

Ninth Day of March, 2004

JON W. DUDAS
*Acting Director of the United States Patent and Trademark Office*